US009254736B2

(12) United States Patent
Kobayashi

(10) Patent No.: US 9,254,736 B2
(45) Date of Patent: Feb. 9, 2016

(54) GLASS RUN CHANNEL

(71) Applicant: TOKAI KOGYO CO., LTD., Obu-shi, Aichi (JP)

(72) Inventor: Yosuke Kobayashi, Obu (JP)

(73) Assignee: TOKAI KOGYO CO., LTD., Obu-shi (JP)

( * ) Notice: Subject to any disclaimer, the term of this patent is extended or adjusted under 35 U.S.C. 154(b) by 0 days.

(21) Appl. No.: 14/386,115

(22) PCT Filed: Mar. 18, 2013

(86) PCT No.: PCT/JP2013/057625
§ 371 (c)(1),
(2) Date: Sep. 18, 2014

(87) PCT Pub. No.: WO2013/161446
PCT Pub. Date: Oct. 31, 2013

(65) Prior Publication Data

US 2015/0047264 A1 Feb. 19, 2015

(30) Foreign Application Priority Data

Apr. 25, 2012 (JP) ................................ 2012-099536

(51) Int. Cl.
*B60J 10/04* (2006.01)
*B60J 10/00* (2006.01)
*E06B 7/23* (2006.01)

(52) U.S. Cl.
CPC ............ *B60J 10/042* (2013.01); *B60J 10/0005* (2013.01); *E06B 7/2303* (2013.01); *E06B 7/2314* (2013.01)

(58) Field of Classification Search
CPC ... B60J 10/042; B60J 10/0005; E06B 7/2303; E06B 7/2314
See application file for complete search history.

(56) References Cited

U.S. PATENT DOCUMENTS 6,485,663 B1 * 11/2002 Dover ...................... 264/173.17
6,625,931 B2 * 9/2003 Omori et al. .................... 49/440
6,708,450 B2 * 3/2004 Tanaka et al. ................... 49/441
7,316,097 B2 * 1/2008 Shiraiwa et al. ................ 49/441
7,763,197 B2 * 7/2010 Ellis et al. ................ 264/173.17

(Continued)

FOREIGN PATENT DOCUMENTS

JP A-2004-106825 4/2004
JP A-2005-088718 4/2005

(Continued)

OTHER PUBLICATIONS

May 7, 2013 Written Opinion issued in International Application No. PCT/JP2013/057625.

(Continued)

*Primary Examiner* — Katherine Mitchell
*Assistant Examiner* — Marcus Menezes
(74) *Attorney, Agent, or Firm* — Oliff PLC

(57) ABSTRACT

A glass run channel includes a run channel main body including a bottom wall portion, an interior lateral wall portion, and an exterior lateral wall portion, and an interior seal lip and an exterior seal lips. At least one lateral wall portion and the bottom wall portion are formed from a sponge material. At least one lateral wall connecting portion among an interior lateral wall connecting portion and an exterior lateral wall connecting portion is formed from the sponge material thinner than the interior lateral wall portion, the exterior lateral wall portion, and the bottom wall portion so as to be capable of being bent when being mounted on the window frame. An outer peripheral side of the lateral wall connecting portion formed from the sponge material is covered with a covering portion made of a solid material.

4 Claims, 4 Drawing Sheets

(56) References Cited

U.S. PATENT DOCUMENTS

| | | | | |
|---|---|---|---|---|
| 2006/0064936 | A1* | 3/2006 | Shiraiwa et al. | 49/441 |
| 2006/0248802 | A1* | 11/2006 | Tamaoki et al. | 49/441 |
| 2009/0256398 | A1* | 10/2009 | Ota | 296/201 |
| 2013/0168995 | A1* | 7/2013 | Kobayashi et al. | 296/146.2 |

FOREIGN PATENT DOCUMENTS

| | | |
|---|---|---|
| JP | A-2006-056363 | 3/2006 |
| JP | A-2011-178199 | 9/2011 |
| JP | A-2011-225205 | 11/2011 |

OTHER PUBLICATIONS

Aug. 19, 2014 Japanese Office Action issued in Japanese Application No. 2012-099536 (with translation).

May 7, 2013 International Search Report issued in International Application No. PCT/JP2013/057625.

* cited by examiner

UPPER SIDE
FRONT SIDE
REAR SIDE
LOWER SIDE
10
12
15
20
30
31
32
33
34
41
42
43
III
III
110
115
120
130
131
132
133
134
135
141
142
143
144

UPPER SIDE
LOWER SIDE
FRONT SIDE
REAR SIDE
30
31
32
33
34
41
42
43
130
131
132
133
134
135
141
142
143
144

INTERIOR SIDE ⟵⟶ EXTERIOR SIDE
12
14
68
20
14a
61
57a
57
51
25
56
56a
59
15
53
65
66
53a
51a
63
13a
52
52a
62
31
58
60
50
67
13

GLASS RUN CHANNEL

TECHNICAL FIELD

The present invention relates to a glass run channel used for a front door or a rear door of a vehicle, and particularly, to a glass run channel that is mounted on a window frame of a front door or a rear door of a vehicle, guides a periphery of a window pane when the window pane is moved up and down, and seals between the window pane and the window frame when the window pane is closed.

BACKGROUND ART

In recent years, as weight reduction of vehicles is required, weight reduction of glass run channels is required. Thus, for example, a technique of forming a glass run channel from a foamable thermoplastic elastomer is known as disclosed in JP-A-2005-88718. In this technique, the glass run channel integrally includes a base portion (including a bottom wall portion, an interior lateral wall portion, an exterior lateral wall portion, an interior lateral wall connecting portion, and an exterior lateral wall connecting portion) and a lip portion, and the base portion is formed from the foamable thermoplastic elastomer.

SUMMARY OF INVENTION

Problem to be Solved by the Invention

Incidentally, in the glass run channel disclosed in JP-A-2005-88718, the base portion (including the bottom wall portion, the interior lateral wall portion, the exterior lateral wall portion, the interior lateral wall connecting portion, and the exterior lateral wall connecting portion) formed from a sponge material (foamable thermoplastic elastomer) has a lower specific gravity compared to a solid material and is effective in weight reduction. However, strength becomes weak. Particularly, since the interior lateral wall connecting portion and the exterior lateral wall connecting portion in the base portion of the glass run channel are formed so as to be thinner than the bottom wall portion, the interior lateral wall portion and the exterior lateral wall portion, these portions are easily torn off.

As a countermeasure thereto, it can be considered to make the thicknesses of the interior lateral wall connecting portion and the exterior lateral wall connecting portion to be larger to increase the strength. However, if the thicknesses of the interior lateral wall connecting portion and the exterior lateral wall connecting portion are made larger, the interior lateral wall connecting portion and the exterior lateral wall connecting portion becomes difficult to be bent, and the workability when attaching the glass run channel to the window frame degrades. Additionally, in a state where the glass run channel is attached to the window frame, there is a possibility that the exterior lateral wall portion and the exterior lateral wall portion easily open to the outside and the glass run channel may come off from the window frame.

In view of the above-described problems, an object of the invention is to provide a glass run channel that can prevent occurrence of tearing-off of a lateral wall connecting portion formed from a sponge material even if the lateral wall connecting portion is thinly formed, while achieving weight reduction.

Solution to Problem

In order to solve the above-described problems, a glass run channel according to claim 1 of the invention is mounted on a window frame of a vehicle body so as to guide a movement of a window pane and formed in an elongated shape from a polymer material, the glass run channel including: a run channel main body including a bottom wall portion provided at a position that faces an end surface of the window pane and an interior lateral wall portion and an exterior lateral wall portion that respectively rise from both ends of the bottom wall portion in a width direction, and formed to have a U-shaped cross-section; and an interior seal lip and an exterior seal lip respectively protruding from opening-side ends of the interior lateral wall portion and the exterior lateral wall portion toward the bottom wall portion and capable of coming into elastic contact with respective surfaces of the window pane, wherein at least one lateral wall portion among the interior lateral wall portion and the exterior lateral wall portion, and the bottom wall portion are formed from a sponge material, wherein the interior lateral wall portion and the bottom wall portion are connected together by an interior lateral wall connecting portion, and the exterior lateral wall portion and the bottom wall portion are connected together by an exterior lateral wall connecting portion, wherein at least one lateral wall connecting portion among the interior lateral wall connecting portion and the exterior lateral wall connecting portion is formed from the sponge material that is thinner than the interior lateral wall portion, the exterior lateral wall portion, and the bottom wall portion, and wherein an outer peripheral side of the lateral wall connecting portion formed from the sponge material is covered with a covering portion formed from a solid material.

According to the above-described configuration, since at least one lateral wall portion among the interior lateral wall portion and the exterior lateral wall portion, and the bottom wall portion are formed from the sponge material, the weight reduction of the overall glass run channel can be achieved compared to a case where these portions are formed from a solid material.

Additionally, the outer peripheral side of at least one lateral wall connecting portion among the interior lateral wall connecting portion and the exterior lateral wall connecting portion is covered with the covering portion made of the solid material having a greater tensile strength than that of the sponge material. Accordingly, when the interior lateral wall connecting portion and the exterior lateral wall connecting portion are bent and the glass run channel is attached to the window frame, the outer peripheral side of the lateral wall connecting portion formed from the sponge material is reinforced with the covering portion and is not easily torn off, even if an outer periphery of the lateral wall connecting portion formed from the sponge material is stretched. For this reason, even if the lateral wall connecting portion formed from the sponge material is thinly formed, the occurrence of tearing-off of the lateral wall connecting portion can be prevented.

Additionally, the lateral wall connecting portion formed from the sponge material is formed to be thinner than the interior lateral wall portion, the exterior lateral wall portion, and the bottom wall portion, and can be easily bent. For this reason, when the glass run channel is attached to the window frame, the lateral wall connecting portion formed from the sponge material can be easily bent and attached, and attachability does not degrade.

Additionally, the outer peripheral side of the lateral wall connecting portion formed from the sponge material is covered with the covering portion made of the solid material having a smaller permanent distortion than that of the sponge material. For this reason, even if a long period of time has passed after the glass run channel is attached to the window frame, the shape of the glass run channel in an attachment state can be maintained, and the glass run channel can be prevented from coming off from the window frame.

The sponge material is a polymer material that is foamed, and the solid material is a polymer material that is not foamed.

The glass run channel according to claim 2 of the invention is the glass run channel according to claim 1, wherein the sponge material includes an olefin-based thermoplastic elastomer having a specific gravity of 0.5 or larger and smaller than 0.8, and the solid material includes an olefin-based thermoplastic elastomer having a specific gravity of 0.8 or larger and 1.0 or smaller.

According to the configuration, in addition to the effects of the invention described in claim 1, the weight reduction can be achieved while ensuring the rigidity of the glass run channel. Additionally, the occurrence of tearing-off of the lateral wall connecting portion formed from the sponge material can be favorably prevented. That is, the rigidity of the glass run channel is insufficient when the specific gravity of the sponge material is smaller than 0.5, and the effect of reducing the weight of the glass run channel becomes small when the specific gravity of the sponge material is 0.8 or larger. Additionally, the effect of suppressing tearing-off of the lateral wall connecting portion is small when the specific gravity of the solid material is smaller than 0.8, and the effect of reducing the weight of the glass run channel is small when the specific gravity is larger than 1.0.

The glass run channel according to claim 3 of the invention is the glass run channel according to claim 1 or 2, wherein the solid material has a tensile strength of 4.5 MPa or larger.

According to the configuration, in addition to the effects of the invention described in claim 1 or 2, the effect of preventing the occurrence of the tearing-off of the lateral wall connecting portion formed from the sponge material is large. That is, when the tensile strength of the solid material is smaller than 4.5 MPa, it is difficult to suppress the occurrence of tearing-off of the lateral wall connecting portion.

the glass run channel according to claim 4 of the invention is the glass run channel according to any one of claims 1 to 3, wherein an interior holding lip and an exterior holding lip, which respectively protrude from external surfaces of the interior lateral wall portion and the exterior lateral wall portion, are formed, and wherein the covering portion that covers the lateral wall connecting portion formed from the sponge material and the holding lip adjacent to the covering portion are integrally formed from the same solid material.

According to the configuration, in addition to the effects of the invention described in any one of claims 1 to 3, it is not necessary to prepare a special solid material for forming the covering portion of the lateral wall connecting portion, and the covering portion can be easily formed.

DESCRIPTION OF EMBODIMENTS

Modes for carrying out the invention will be described according to Embodiments.

Embodiment 1

Figure 1:
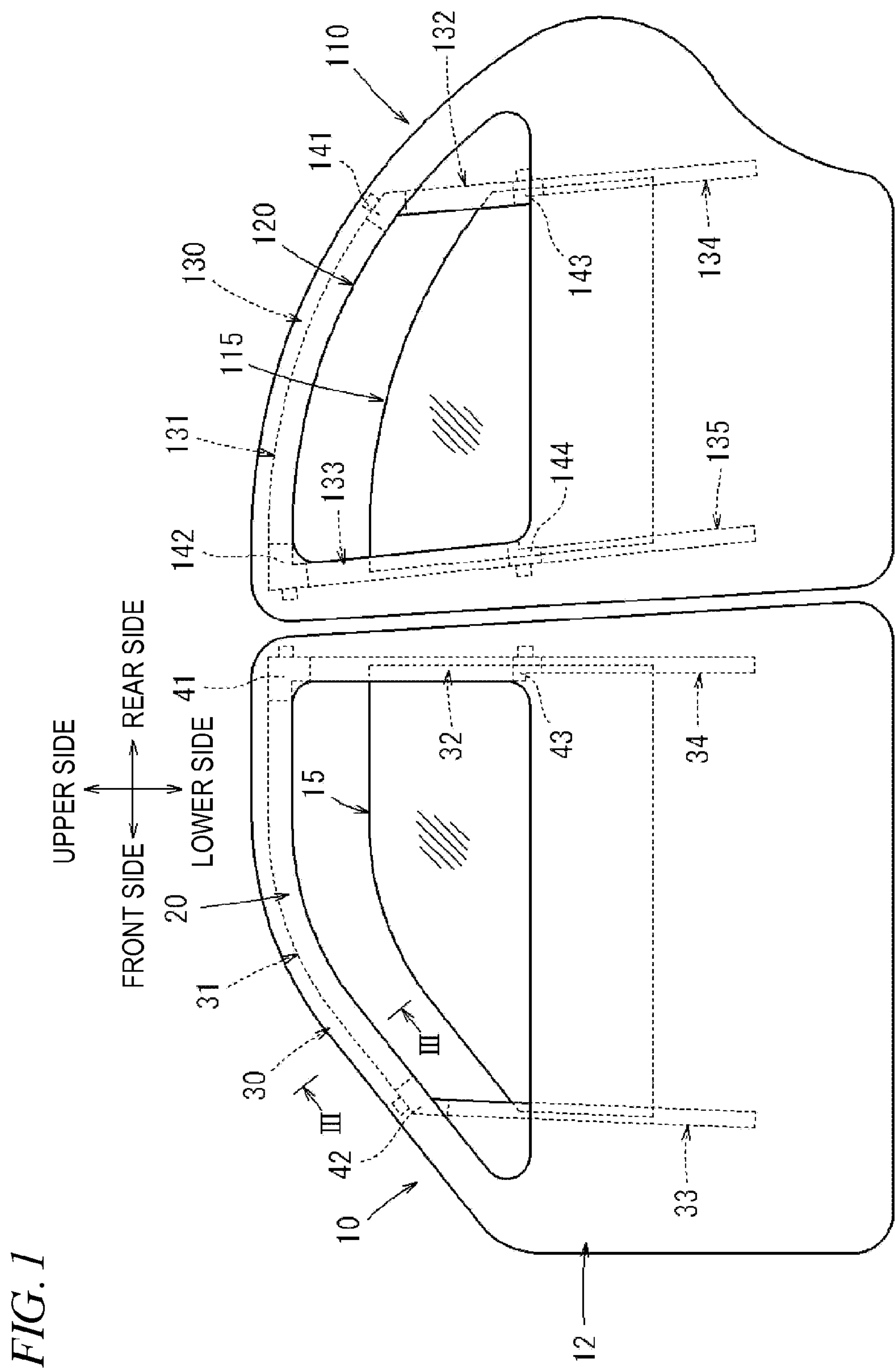
FIG. 1 is a simplified side view showing a state where a glass run channel assembly using a glass run channel related to Embodiment 1 of the invention is mounted on each of a window frame of a front door and a window frame of a rear door.

Embodiment 1 of the invention will be described according to FIGS. 1 to 3. As shown in FIG. 1, a window frame 20 is integrally formed at a door panel 12 that forms a front door 10 as a vehicle door. As shown in FIG. 3, in the window frame 20, a run mounting portion (space portion) 25 is formed by an inner panel 13 and an outer panel 14 that constitute the door panel 12.

Figure 2:
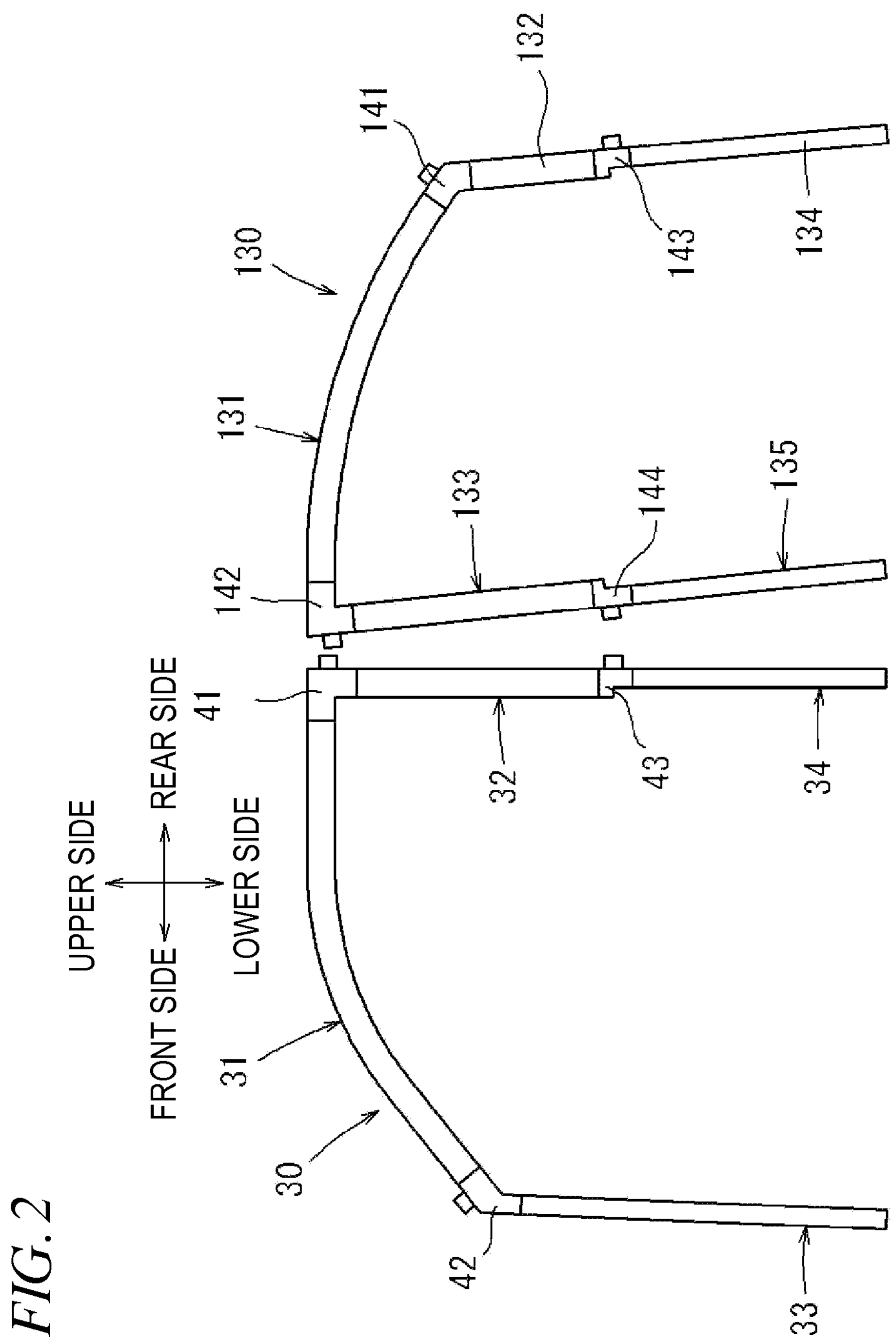
FIG. 2 is a side view also showing the glass run channel assembly.
Figure 3:
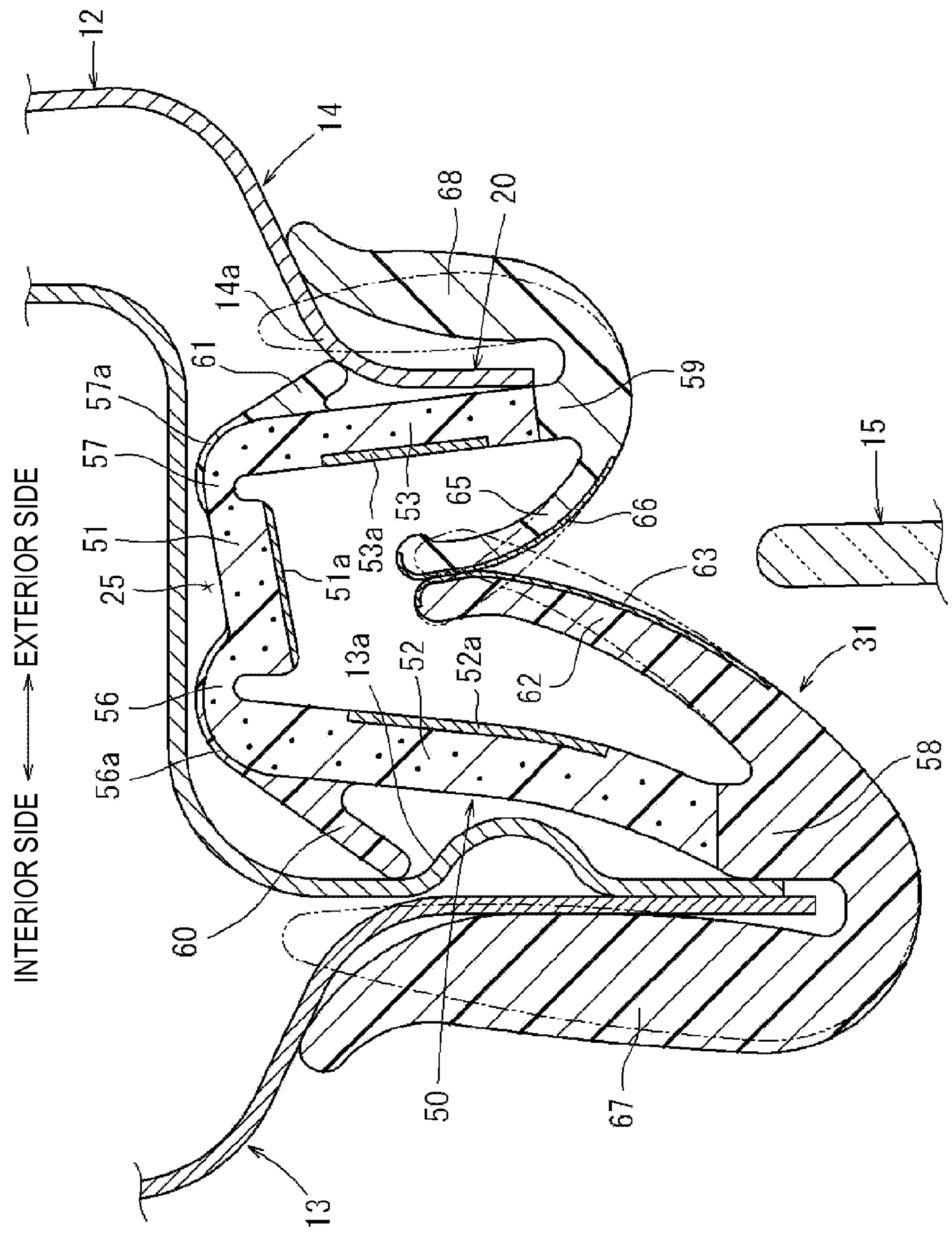
FIG. 3 is a cross-sectional view, also of the glass run channel, taken along line III-III of FIG. 1.

As shown in FIGS. 1 and 2, a front glass run channel assembly 30, which is mounted on the window frame 20 of the front door 10 as a vehicle door so as to guide the moving up and down of the window pane 15 and is formed in an elongated shape from a polymer material (thermoplastic elastomer material), has first to fourth glass run channels 31, 32, 33, and 34 that are formed in an elongated shape by extrusion molding, and first to third connecting bodies 41, 42, and 43 that are formed by injection molding.

The first glass run channel 31 is mounted along an upper side portion and a front oblique side portion of the front door 10. An upper end of the second glass run channel 32 is connected to a rear end of the first glass run channel 31 by the first connecting body (corner connecting body) 41. The second glass run channel 32 is mounted along a rear vertical side portion of the front door 10. Additionally, an upper end of the third glass run channel 33 is connected to a front end of the first glass run channel 31 by the second connecting body (corner connecting body) 42. The third glass run channel 33 is mounted along a front vertical frame portion ranging from a rear edge of a front quarter window of the front door 10 to the inside of the door. Additionally, a lower end of the second glass run channel 32 is located within the door, and an upper end of the fourth glass run channel 34 is connected to the lower end by the third connecting body 43. The fourth glass run channel 34 is mounted along a rear vertical frame portion within the door.

Among the first to fourth glass run channels 31 to 34 that constitute the front glass run channel assembly 30, the first glass run channel 31 is constituted by an extrusion-molded article having a cross-sectional shape as shown in FIG. 3. A run channel main body 50 that forms a main portion of the first glass run channel 31 has a bottom wall portion 51 provided at a position that faces an end face of the window pane 15, and an interior lateral wall portion 52 and an exterior lateral wall portion 53 that respectively rise from both ends of the bottom wall portion 51 in the width direction and constitute grooves along which a peripheral edge portion of the window pane 15 can be moved up and down.

Additionally, an interior lip connecting portion 58 and an exterior lip connecting portion 59 are respectively formed at the opening-side ends of the interior lateral wall portion 52 and the exterior lateral wall portion 53. Also, an interior seal lip 62 and an exterior seal lip 65 are formed so as to respectively protrude from the interior lip connecting portion 58 and the exterior lip connecting portion 59 toward the bottom wall portion 51, and are capable of coming into elastic contact with respective surfaces of the window pane 15. Moreover, an interior decorative portion 67 and an exterior decorative portion 68 are provided so as to protrude from the interior lip connecting portion 58 and the exterior lip connecting portion 59 toward sides opposite to both of the interior and exterior seal lips 62 and 65 and are respectively formed in a folded manner along both the lateral wall portions 52 and 53. That is, the interior decorative portion 67 and the interior seal lip 62 are connected together by the interior lip connecting portion 58, and the exterior seal lip 65 and the exterior decorative portions 68 are connected together by the exterior lip connecting portion 59.

Additionally, as shown in FIG. 3, an interior holding lip 60 and an exterior holding lip 61 that form a lip shape are respectively formed to external surfaces of the end portions of the interior lateral wall portion 52 and the exterior lateral wall portion 53 on the bottom wall portion 51 side. The interior holding lip 60 and the exterior holding lip 61 are respectively provided to protrude obliquely from the interior lateral wall portion 52 and the exterior lateral wall portion 53. Additionally, the interior holding lip 60 and the exterior holding lip 61 are respectively elastically engaged with an interior stepped portion 13*a* and an exterior stepped portion 14*a* of the window frame 20 so as to prevent coming off.

At least one lateral wall portion among the interior lateral wall portion 52 and the exterior lateral wall portions 53, and the bottom wall portion 51 are extrusion-molded from a material including olefin-based thermoplastic elastomer and a thermally expandable capsule, and are formed from a sponge material having foaming cells resulting from the expansion of the thermally expandable capsule. Additionally, the interior lateral wall portion 52 and the bottom wall portion 51 are connected together by an interior lateral wall connecting portion 56, and the exterior lateral wall portion 53 and the bottom wall portion 51 are connected together by an exterior lateral wall connecting portion 57. At least one lateral wall connecting portion among the interior lateral wall connecting portion 56 and the exterior lateral wall connecting portion 57 is formed from the sponge material having a smaller thickness than those of the interior lateral wall portion 52, the exterior lateral wall portion 53, and the bottom wall portion 51 so as to be capable of being bent when being mounted on the window frame 20.

In the Embodiment 1, both of the interior lateral wall portion 52 and the exterior lateral wall portion 53 are formed from the sponge material. Moreover, both of the interior lateral wall connecting portion 56 and the exterior lateral wall connecting portion 57 are formed from the sponge material having a smaller thickness than the interior lateral wall portion 52, the exterior lateral wall portion 53, and the bottom wall portion 51.

Also, outer peripheral sides of the interior lateral wall connecting portion 56 and the exterior lateral wall connecting portion 57 that are formed from the sponge material are covered with covering portions 56*a* and 57*a*, respectively, which are formed from a solid material including a thermoplastic elastomer that does not have foaming cells. Additionally, in this Embodiment 1, the covering portions 56*a* and 57*a* are continuous with root portions of the interior holding lip 60 and the exterior holding lip 61, and are integrally formed from the same solid material as the interior holding lip 60 and the exterior holding lip 61.

Additionally, it is preferable that the sponge material includes olefin-based thermoplastic elastomer having a specific gravity of 0.5 or larger and smaller than 0.8, and it is more preferable that the specific gravity is 0.55 to 0.75, and it is still more preferable that the specific gravity is 0.65. Additionally, as the olefin-based thermoplastic elastomer material that serves as a principal component of the sponge material, for example, materials obtained by mixing ethylene propylene diene copolymer (EPDM) and polypropylene (PP), and blending additives, such as a plasticizer and a colorant, with this mixture, are used.

Additionally, the solid material, which forms each of the interior lip connecting portion 58, the exterior lip connecting portion 59, the interior holding lip 60, the exterior holding lip 61, the interior seal lip 62, the exterior seal lip 65, the covering portion 56*a*, and the covering portion 57*a*, includes thermoplastic elastomer that is the same material as or has compatibility with the thermoplastic elastomer material serving as the principal component of the sponge material and that does not have foaming cells. Additionally, the solid material includes olefin-based thermoplastic elastomer having a specific gravity of 0.8 or larger and 1.0 or smaller. Additionally, the solid material preferably has a tensile strength of 4.5 MPa or larger. In this Embodiment 1, the tensile strength of the solid material is set to 7.0 MPa, and the tensile strength of the sponge material is set to 4.1 MPa.

Additionally, in the Embodiment 1, low-friction layers 63 and 66 are respectively formed on the surfaces of the interior seal lip 62 and the exterior seal lip 65 that come into contact with the window pane 15. The low-friction layers 63 and 66 are formed from a low-friction material (thermoplastic elastomer material or thermoplastic resin) having a small coefficient of dynamic friction with respect to the window pane 15, and is the same material as or has compatibility with the interior seal lip 62 and the exterior seal lip 65.

Additionally, in the Embodiment 1, low-friction layers 51*a*, 52*a*, and 53*a*, which are made of a low-friction material having a smaller coefficient of dynamic friction than the bottom wall portion 51, the interior lateral wall portion 52, and the exterior lateral wall portion 53, are also formed on a bottom surface of the bottom wall portion 51 and inner surfaces of the interior lateral wall portion 52 and the exterior lateral wall portion 53.

Additionally, run channel main bodies, which form main portions of the respective second, third, and fourth glass run channels 32, 33, and 34 among the first to fourth glass run channels 31 to 34 that constitute the front glass run channel assembly 30, are configured similarly to the run channel main body 50 that forms the main portion of the first glass run channel 31 except that the cross-sectional shapes thereof are different. In addition, two or more glass run channels, for example, the second glass run channel 32 and the third glass run channel 33, among the first to fourth glass run channels 31 to 34 may have the same cross-sectional shape. Additionally, in the first to fourth glass run channels 31 to 34, the portions formed from the sponge material and the portions formed from the solid material (also including the low-friction layers 51*a*, 52*a*, 53*a*, 63, and 66) are integrally formed by co-extrusion of extrusion molding.

Additionally, as shown in FIG. 1 and FIG. 2, a rear glass run channel assembly 130, which is mounted on a window frame 120 of a rear door 110 as a vehicle door for guiding the lifting motion of a window pane 115 and is elongated and made of a polymer material (thermoplastic elastomer material), has first to fifth glass run channels 131, 132, 133, 134, and 135 that are formed in an elongated shape by extrusion molding, and first to fourth connecting bodies 141, 142, 143, and 144 that are formed by injection molding.

The first glass run channel 131 is mounted along an upper side portion of the rear door 110. An upper end of the second glass run channel 132 is connected to a rear end of the first glass run channel 131 by the first connecting body (corner connecting body) 141. The second glass run channel 132 is mounted along a front edge of a rear quarter window of the rear door 110. Additionally, an upper end of the third glass run channel 133 is connected to a front end of the first glass run channel 131 by the second connecting body (corner connecting body) 142. The third glass run channel 133 is mounted along a front vertical side portion of the rear door 110. Additionally, an upper end of the fourth glass run channel 134 is connected to a lower end of the second glass run channel 132 by the third connecting body 143. The fourth glass run channel 134 is mounted along a rear vertical frame portion within the door. Moreover, an upper end of the fifth glass run channel 135 is connected to a lower end of the third glass run channel 133 by the fourth connecting body 144. The fifth glass run channel 135 is mounted along a front vertical frame portion within the door.

Also, in the Embodiment 1, the first glass run channel 131 among the first to fifth glass run channels 131 to 135 that constitute the rear glass run channel assembly 130 is formed in the same structure as the first glass run channel 31 of the front glass run channel assembly 30 (refer to FIG. 3). Additionally, run channel main bodies, which form main portions of the second to fifth glass run channels 132 to 135 that constitute the rear glass run channel assembly 130, are configured similarly to the run channel main body that forms the main portion of the first glass run channel 131 except that the cross-sectional shapes thereof are different.

The glass run channel related to the Embodiment 1 is configured as described above. Accordingly, in the glass run channel (the first to fourth glass run channels 31 to 34 that constitute the front glass run channel assembly 30 and the first to fifth glass run channels 131 to 135 that constitute the rear glass run channel assembly 130), the interior lateral wall portion 52, the exterior lateral wall portion 53, and the bottom wall portion 51 are formed from the sponge material. Therefore, the weight reduction of the overall glass run channel can be achieved compared to a case where these portions are formed from the solid material.

Additionally, the outer peripheral sides of the interior lateral wall connecting portion 56 and the exterior lateral wall connecting portion 57 are covered with the covering portions 56*a* and 57*a*, respectively, which are made of the solid material having a greater tensile strength than that of the sponge material. Accordingly, when the interior lateral wall connecting portion 56 and the exterior lateral wall connecting portion 57 are bent and the glass run channel is attached to the window frame 20, the outer peripheral sides of the interior lateral wall connecting portion 56 and the exterior lateral wall connecting portion 57 that are formed from the sponge material are reinforced with the covering portions 56*a* and 57*a* and are not easily torn off, even if the outer peripheries of the interior lateral wall connecting portion 56 and the exterior lateral wall connecting portion 57 that are formed from the sponge material are stretched. For this reason, even if the thicknesses of the interior lateral wall connecting portion 56 and the exterior lateral wall connecting portion 57 that are formed from the sponge material are made smaller than those of the interior lateral wall portion 52, the exterior lateral wall portion 53, and the bottom wall portion 51, the occurrence of tearing-off of the interior lateral wall connecting portion 56 and the exterior lateral wall connecting portion 57 can be prevented.

Additionally, the interior lateral wall connecting portion 56 and the exterior lateral wall connecting portion 57 that are formed from the sponge material are formed to be thinner than the interior lateral wall portion 52, the exterior lateral wall portion 53, and the bottom wall portion 51, and bending becomes easy. For this reason, when the glass run channel assembly 30 (130) is attached to the window frame 20 (120), the interior lateral wall connecting portion 56 and the exterior lateral wall connecting portion 57 that are formed from the sponge material can be easily bent and attached, and attachability does not degrade.

Additionally, the outer peripheral sides of the interior lateral wall connecting portion 56 and the exterior lateral wall connecting portion 57 that are formed from the sponge material are respectively covered with the covering portions 56*a* and 57*a* made of the solid material having a smaller permanent distortion than that of the sponge material. For this reason, even if a long period of time has passed after the glass run channel assembly 30 (130) is attached to the window frame 20 (120), the shape of the glass run channel in an attachment state can be maintained, and the glass run channel can be prevented from coming off from the window frame 20.

Additionally, in the Embodiment 1, the sponge material, which forms the interior lateral wall portion 52, the exterior lateral wall portion 53, the bottom wall portion 51, the interior lateral wall connecting portion 56, and the exterior lateral wall connecting portion 57, is made of the olefin-based thermoplastic elastomer having a specific gravity of 0.5 or larger and smaller than 0.8. Accordingly, the weight reduction can be achieved while ensuring the rigidity of the glass run channel. That is, the rigidity of the glass run channel is insufficient when the specific gravity of the sponge material is smaller than 0.5, and the effect of reducing the weight of the glass run channel becomes small when the specific gravity of the sponge material is 0.8 or larger.

Additionally, in the Embodiment 1, the solid material includes the olefin-based thermoplastic elastomer having a specific gravity of 0.8 or larger and 1.0 or smaller. Accordingly, the occurrence of tearing-off of the interior lateral wall connecting portion 56 and the exterior lateral wall connecting portion 57 that are formed from the sponge material can be favorably prevented by the covering portions 56*a* and 57*a* formed from the solid material. That is, the effect of suppressing tearing-off of the interior lateral wall connecting portion 56 and the exterior lateral wall connecting portion 57 is small when the specific gravity of the solid material is smaller than 0.8, and the effect of reducing the weight of the glass run channel is small when the specific gravity is larger than 1.0.

Additionally, in the Embodiment 1, since the tensile strength of the solid material is 4.5 MPa or larger, the effect of preventing the occurrence of the tearing-off of the interior lateral wall connecting portion 56 and the exterior lateral wall connecting portion 57 formed from the sponge material is large. That is, when the tensile strength of the solid material is less than 4.5 MPa, it is difficult to suppress the occurrence of tearing-off of the interior lateral wall connecting portion 56 and the exterior lateral wall connecting portion 57.

Additionally, in the Embodiment 1, the covering portions 56*a* and 57*a* of the interior lateral wall connecting portion 56 and the exterior lateral wall connecting portion 57 are integrally formed from the same solid material as the interior holding lip 60 and the exterior holding lip 61 that are adjacent to thereto. For this reason, it is not necessary to prepare a special solid material for forming the covering portions 56*a* and 57*a*, and the covering portions 56*a* and 57*a* can be easily formed.

Embodiment 2

Figure 4:
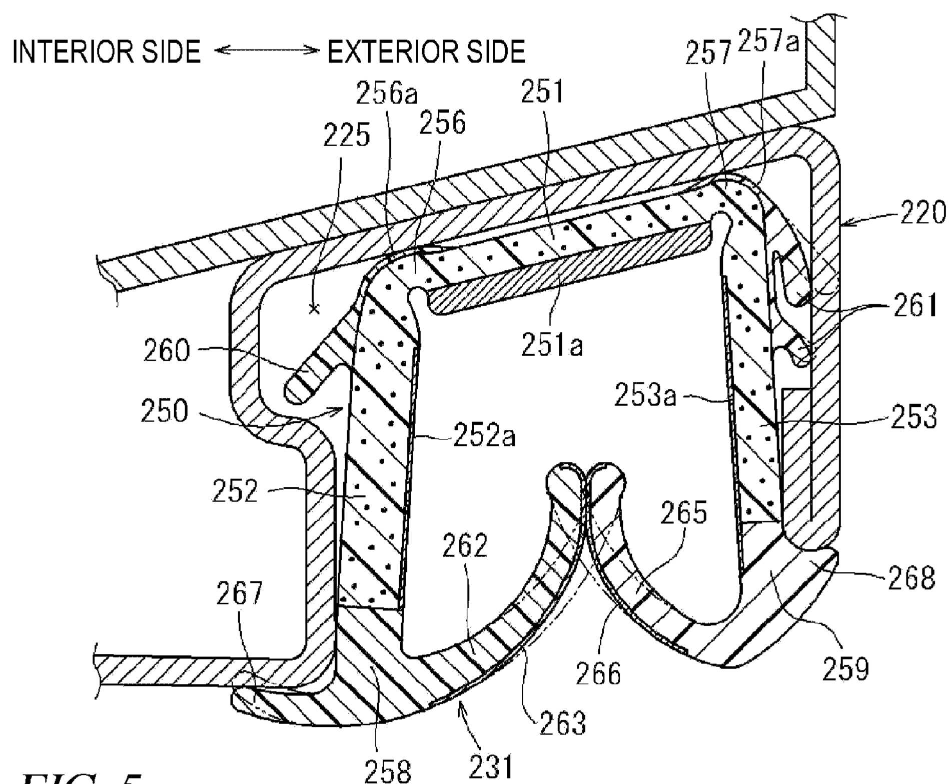
FIG. 4 is a cross-sectional view of a glass run channel related to Embodiment 2 of the invention, taken along line III-III of FIG. 1.

Next, Embodiment 2 of the invention will be described according to FIG. 4. As shown in FIG. 4, in the Embodiment 2, a case where a window frame is formed by a sash-type window frame sash is illustrated. A window frame sash 220 that constitutes the window frame is formed separately from a door panel of a vehicle opening-and-closing door (a front door, a rear door, or the like), and is fixed to the door panel. The window frame sash 220 is formed with a run mounting concave portion 225.

A glass run channel 231, which is one of a plurality of glass run channels that constitute a glass run channel assembly, has a run channel main body 250 that forms a main portion, similarly to the Embodiment 1. That is, the run channel main body 250 has a bottom wall portion 251, an interior lateral wall portion 252, and an exterior lateral wall portion 253. Also, an interior seal lip 262 and an exterior seal lip 265 are formed so as to respectively protrude from an interior lip connecting portion 258 and an exterior lip connecting portion 259 at opening-side ends of the interior lateral wall portion 252 and the exterior lateral wall portion 253 toward the bottom wall portion 251, and are capable of coming into elastic contact with respective surfaces of the window pane. Moreover, an interior decorative portion 267 and an exterior decorative portion 268 are provided so as to protrude from the interior lip connecting portion 258 and the exterior lip connecting portion 259 toward sides opposite to both of the interior and exterior seal lips 262 and 265.

Additionally, a single or a plurality of interior holding lips 260 and a single or a plurality of exterior holding lips 261 are respectively formed on external surfaces of the end portions of the interior lateral wall portion 252 and the exterior lateral wall portion 253 on the bottom wall portion 251 side. Additionally, low-friction layers 263 and 266 are respectively formed on the surfaces of the interior seal lip 262 and the exterior seal lip 265 that come into contact with the window pane, similarly to the Embodiment 1. Moreover, low-friction layers 251*a*, 252*a*, and 253*a* are also formed on the bottom surface of the bottom wall portion 251, and on the inner surfaces of the interior lateral wall portion 252 and the exterior lateral wall portion 253, similarly to the Embodiment 1.

Additionally, also in the Embodiment 2, the interior lateral wall portion 252, the exterior lateral wall portion 253, and the bottom wall portion 251 are formed from the sponge material, substantially similar to the Embodiment 1. Moreover, an interior lateral wall connecting portion 256 and an exterior lateral wall connecting portion 257 are also formed from the sponge material having a smaller thickness than the interior lateral wall portion 252, the exterior lateral wall portion 253, and the bottom wall portion 251.

Also, outer peripheral sides of the interior lateral wall connecting portion 256 and the exterior lateral wall connecting portion 257 that are formed from the sponge material are respectively covered with covering portions 256*a* and 257*a*, which are formed from the solid material including the thermoplastic elastomer that does not have foaming cells. Additionally, the covering portions 256*a* and 257*a* are continuous with root portions of the interior holding lip 260 and the exterior holding lip 261, and are integrally formed from the same solid material as the interior holding lip 260 and the exterior holding lip 261.

Since the other configuration of the Embodiment 2 is configured similarly to the Embodiment 1, the description thereof will be omitted.

The glass run channel related to the Embodiment 2 is configured as described above. Accordingly, also in the Embodiment 2, the same working effects as in the Embodiment 1 can be obtained. That is, since the interior lateral wall portion 252, the exterior lateral wall portion 253, and the bottom wall portion 251 are formed from the sponge material, the weight reduction of the overall glass run channel can be achieved compared to a case where these portions are formed from the solid material.

Additionally, the outer peripheral sides of the interior lateral wall connecting portion 256 and the exterior lateral wall connecting portion 257 are respectively covered with the covering portions 256*a* and 257*a*, which are made of the solid material having a larger tensile strength than that of the sponge material. Accordingly, when the interior lateral wall connecting portion 256 and the exterior lateral wall connecting portion 257 are bent and the glass run channel is attached to the window frame sash 220, the outer peripheral sides of the interior lateral wall connecting portion 256 and the exterior lateral wall connecting portion 257 that are formed from the sponge material are reinforced with the covering portions 256*a* and 257*a* and are not easily torn off, even if the outer peripheries of the interior lateral wall connecting portion 256 and the exterior lateral wall connecting portion 257 that are formed from the sponge material are stretched. For this reason, even if the thicknesses of the interior lateral wall connecting portion 256 and the exterior lateral wall connecting portion 257 that are formed from the sponge material are made smaller than those of the interior lateral wall portion 252, the exterior lateral wall portion 253, and the bottom wall portion 251, the occurrence of tearing-off of the interior lateral wall connecting portion 256 and the exterior lateral wall connecting portion 257 can be prevented.

Embodiment 3

Figure 5:
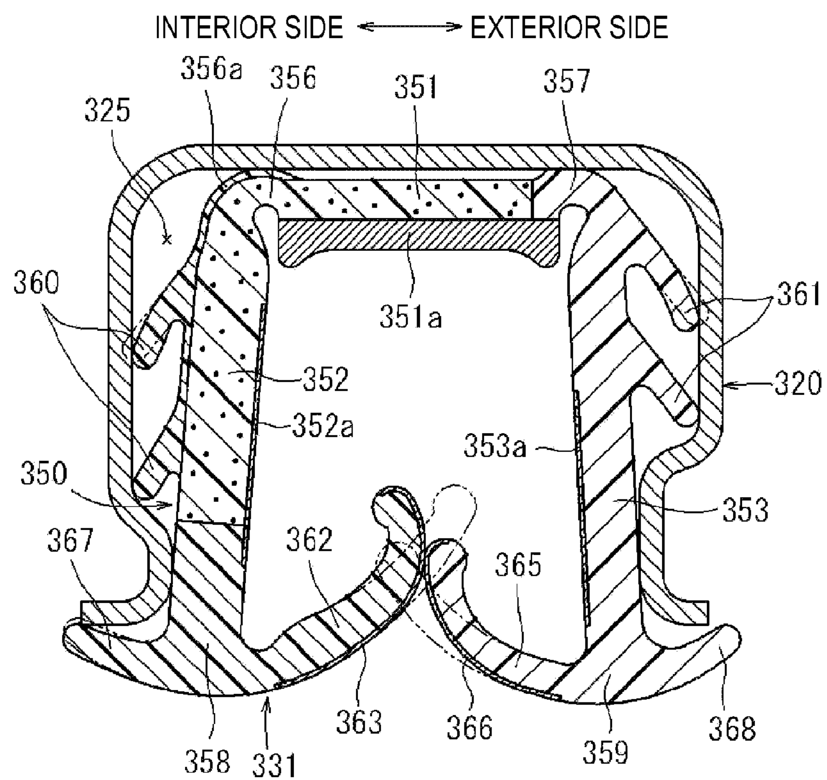
FIG. 5 is a cross-sectional view of a glass run channel related to Embodiment 3 of the invention, taken along line III-III of FIG. 1.

Next, Embodiment 3 of the invention will be described according to FIG. 5. As shown in FIG. 5, also in the Embodiment 3, a window frame is formed by a sash-type window frame sash substantially similarly to the Embodiment 2. A window frame sash 320 is formed separately from a door panel of a vehicle opening-and-closing door (a front door, a rear door, or the like) and is fixed to the door panel. The window frame sash 320 is formed with a run mounting concave portion 325.

A glass run channel 331, which is one of a plurality of glass run channels that constitute a glass run channel assembly, has a run channel main body 350 that forms a main portion, similarly to the Embodiment 1. That is, the run channel main body 350 has a bottom wall portion 351, an interior lateral wall portion 352, and an exterior lateral wall portion 353. Also, an interior seal lip 362 and an exterior seal lip 365 are formed so as to respectively protrude from an interior lip connecting portion 358 and an exterior lip connecting portion 359 at opening-side ends of the interior lateral wall portion 352 and the exterior lateral wall portion 353 toward the bottom wall portion 351, and are capable of coming into elastic contact with respective surfaces of the window pane. Moreover, an interior decorative portion 367 and an exterior decorative portion 368 are provided so as to protrude from the interior lip connecting portion 358 and the exterior lip connecting portion 359 toward sides opposite to both of the interior and exterior seal lips 362 and 365.

Additionally, a single or a plurality of interior holding lips 360 and a single or a plurality of exterior holding lips 361 are respectively formed on external surfaces of the end portions of the interior lateral wall portion 352 and the exterior lateral wall portion 353 on the bottom wall portion 351 side. Additionally, low-friction layers 363 and 366 are respectively formed on the surfaces of the interior seal lip 362 and the exterior seal lip 365 that come into contact with the window pane, similarly to the Embodiment 1. Moreover, low-friction layers 351*a*, 352*a*, and 353*a* are also formed on the bottom surface of the bottom wall portion 351, and on the inner surfaces of the interior lateral wall portion 352 and the exterior lateral wall portion 353, similarly to Embodiment 1.

Additionally, in the Embodiment 3, one lateral wall portion (the interior lateral wall portion 352 in FIG. 5) among the interior lateral wall portion 352 and the exterior lateral wall portions 353, and the bottom wall portion 351 are extrusion-molded from a material including olefin-based thermoplastic elastomer and a thermally expandable capsule, and are formed from the sponge material having foaming cells resulting from the expansion of the thermally expandable capsule. Additionally, the interior lateral wall portion 352 and the bottom wall portion 351 are connected together by an interior lateral wall connecting portion 356, and the exterior lateral wall portion 353 and the bottom wall portion 351 are connected together by an exterior lateral wall connecting portion 357.

Additionally, in the Embodiment 3, at least one lateral wall connecting portion (the interior lateral wall connecting portion 356 in FIG. 5) among the interior lateral wall connecting portion 356 and the exterior lateral wall connecting portion 357 is formed from the sponge material having a smaller thickness than the interior lateral wall portion 352, the exterior lateral wall portion 353, and the bottom wall portion 351 so as to be capable of being bent when being mounted on the window frame sash 320.

Also, an outer peripheral side of the interior lateral wall connecting portion 356 formed from the sponge material is covered with a covering portion 356*a*, which is formed from the solid material including the thermoplastic elastomer that does not have foaming cells. Additionally, the covering portion 356*a* is continuous with a root portion of the interior holding lip 360, and is integrally formed from the same solid material as the interior holding lip 360.

Additionally, in the Embodiment 3, the exterior lateral wall portion 353 and the exterior lateral wall connecting portion 357 are formed from the solid material. In addition, a case where one lateral wall portion among the interior lateral wall portion 352 and the exterior lateral wall portion 353, and the bottom wall portion 351 are formed from the sponge material is illustrated. However, as shown in FIG. 5, a portion of the interior lateral wall portion 352 at the interior lip connecting portion 358 side may be formed from the solid material. Moreover, the exterior lateral wall connecting portion 357 is formed so as to be thinner than the exterior lateral wall portion 353 and is formed so as to be capable of being easily bent.

Since the other configuration of the Embodiment 3 is configured similarly to the Embodiment 1, the description thereof will be omitted.

The glass run channel related to the Embodiment 3 is configured as described above. Accordingly, in the Embodiment 3, since the interior lateral wall portion 352 and the bottom wall portion 351 are formed from the sponge material, the weight reduction of the overall glass run channel can be achieved compared to a case where these portions are formed from the solid material.

Additionally, the outer peripheral side of the interior lateral wall connecting portion 356 is covered with the covering portion 356*a*, which is made of the solid material having a larger tensile strength than that of the sponge material. Accordingly, when the interior lateral wall connecting portion 356 and the exterior lateral wall connecting portion 357 are bent and the glass run channel is attached to the window frame sash 320, the outer peripheral side of the interior lateral wall connecting portion 356 formed from the sponge material is reinforced with the covering portion 356*a* and is not easily torn off, even if the outer periphery of the interior lateral wall connecting portion 356 formed from the sponge material is stretched. For this reason, even if the thickness of the interior lateral wall connecting portion 356 formed from the sponge material is made smaller than those of the interior lateral wall portion 352, the exterior lateral wall portion 353, and the bottom wall portion 351, the occurrence of tearing-off of the interior lateral wall connecting portion 356 can be prevented.

Additionally, in the Embodiment 3, since the exterior lateral wall portion 353 and the exterior lateral wall connecting portion 357 are formed from the solid material having a greater specific gravity than that of the sponge material, sound insulation and rigidity are excellent compared to a case where these portions are formed from the sponge material.

The invention is not limited to the above-described Embodiments 1 to 3, and can be carried out in various forms without departing from the concept of the invention.

REFERENCE SIGNS LIST

10: FRONT DOOR (VEHICLE DOOR)
15: WINDOW PANE
20: WINDOW FRAME
31 TO 34: FIRST TO FOURTH GLASS RUN CHANNELS (GLASS RUN CHANNELS)
50: RUN CHANNEL MAIN BODY
51: BOTTOM WALL PORTION
52: INTERIOR LATERAL WALL PORTION
53: EXTERIOR LATERAL WALL PORTION
56: INTERIOR LATERAL WALL CONNECTING PORTION
56*a*: COVERING PORTION
57: EXTERIOR LATERAL WALL CONNECTING PORTION
57*a*: COVERING PORTION
60: INTERIOR HOLDING LIP
61: EXTERIOR HOLDING LIP
62: INTERIOR SEAL LIP
65: EXTERIOR SEAL LIP

The invention claimed is:

1. A glass run channel mounted on a window frame of a vehicle body so as to guide a movement of a window pane and formed in an elongated shape from a polymer material, the glass run channel comprising:

a run channel main body including (i) a bottom wall portion provided at a position that faces an end surface of the window pane, the bottom wall portion having one end and another end, and (ii) an interior lateral wall portion and an exterior lateral wall portion that respectively extend from the one end and the other end of the bottom wall portion, and formed to have a U-shaped cross-section; and an interior seal lip and an exterior seal lip respectively protruding from ends of the interior lateral wall portion and the exterior lateral wall portion toward the bottom wall portion and capable of coming into elastic contact with respective surfaces of the window pane, wherein at least one lateral wall portion among the interior lateral wall portion and the exterior lateral wall portion is formed from a first sponge material, and the bottom wall portion is formed from a second sponge material, wherein the interior lateral wall portion and the bottom wall portion are connected together by an interior lateral wall connecting portion, and the exterior lateral wall portion and the bottom wall portion are connected together by an exterior lateral wall connecting portion, wherein at least one lateral wall connecting portion among the interior lateral wall connecting portion and the exterior lateral wall connecting portion is formed from a third sponge material that is thinner than the interior lateral wall portion, the exterior lateral wall portion, and the bottom wall portion, wherein an outer peripheral side of the at least one lateral wall connecting portion formed from the third sponge material is covered with a covering portion formed from a solid material, and wherein an outer side of the bottom wall portion, which faces the window frame, is not covered with the covering portion formed from the solid material, wherein an interior holding lip and an exterior hold lip, which respectively protrude from external surfaces of the interior lateral wall portion and the exterior lateral wall portion, are formed, and wherein the covering portion that covers the at least one lateral wall connecting portion formed from the third sponge material and at least one of the interior holding lip and the exterior holding lip, which is adjacent to the covering portion, are integrally formed from the same solid material.

2. The glass run channel according to claim 1, wherein each of the first sponge material, the second sponge material and the third sponge material includes an olefin-based thermoplastic elastomer having a specific gravity of 0.5 or larger and smaller than 0.8, and the solid material includes an olefin-based thermoplastic elastomer having a specific gravity of 0.8 or larger and 1.0 or smaller.

3. The glass run channel according to claim 1, wherein the solid material has a tensile strength of 4.5 MPa or larger.

4. The glass run channel according to claim 1, wherein, when the glass run channel is attached to the window frame, a gap is formed between the window frame and the outer side of the bottom wall portion not covered with the covering portion formed from the solid material.

* * * * *